(12) United States Patent
Velummylum et al.

(10) Patent No.: US 8,914,856 B1
(45) Date of Patent: Dec. 16, 2014

(54) SYNCHRONIZATION OF NETWORKED STORAGE SYSTEMS AND THIRD PARTY SYSTEMS

(75) Inventors: Piragash Velummylum, Seattle, WA (US); Johanna S. Olson, Bellevue, WA (US); Korwin J. Smith, Seattle, WA (US); James H. Wood, Seattle, WA (US); Christopher G. Emery, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 194 days.

(21) Appl. No.: 13/163,065

(22) Filed: Jun. 17, 2011

(51) Int. Cl.
*G06F 7/04* (2006.01)
*H04L 29/06* (2006.01)
(52) U.S. Cl.
CPC ............... *H04L 63/08* (2013.01); *H04L 63/10* (2013.01)

USPC .................................... 726/5; 726/8; 726/19
(58) Field of Classification Search
None
See application file for complete search history.

(56) References Cited

U.S. PATENT DOCUMENTS

| 2008/0080718 A1* | 4/2008 | Meijer et al. ................ 380/282 |
| 2010/0082713 A1* | 4/2010 | Frid-Nielsen et al. ........ 707/821 |
| 2010/0211781 A1* | 8/2010 | Auradkar et al. ............. 713/168 |

* cited by examiner

*Primary Examiner* — Kaveh Abrishamkar
(74) *Attorney, Agent, or Firm* — Thomas Horstemeyer, LLP

(57) ABSTRACT

Disclosed are various embodiments for the synchronizing of files between a networked storage system and a third party system. A file can be stored in a storage location in a networked storage system. A determination can be whether the storage location is associated with a third party system. An authentication credential can be retrieved that is associated with the third party system. Upload of the file to the third party system can be initiated.

18 Claims, 4 Drawing Sheets

_US 8,914,856 B1_

SYNCHRONIZATION OF NETWORKED STORAGE SYSTEMS AND THIRD PARTY SYSTEMS

BACKGROUND

A file system is a method of storing and organizing computer files and their data. Traditionally, file systems have been tied to physical devices. For example, each floppy disk, optical disk, hard drive, flash drive, etc. may have a file system. In addition, file servers may map a file system across multiple drives using technologies such as redundant arrays of inexpensive disks (RAID), network file systems, and/or other technologies.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing a networked storage system. With the ubiquitous availability of network connectivity for computing devices, users are increasingly seeking ubiquitous availability for their data files. For example, users may want to listen to an audio file from their smartphone, from their office workstation, from their laptop at home, and/or from other computing devices. Additionally, users may seek to upload or backup files within a remote or networked storage system that provides data redundancy, improved data accessibility, and other benefits. Various embodiments of the present disclosure relate to remote storage of data files and subsequent uploading of certain of these data files to third party systems. In the context of this disclosure, a third party system can include another networked storage system, media storage system, social networking system, publishing system (e.g., blogging network, microblogging network, etc.), or any other third party system in which data files can be published and/or stored.

A networked storage system may be employed to provide access to files stored in a cloud computing resource comprising a networked plurality of computing devices. In some embodiments, the networked storage system may correspond to a virtual file system where the actual data objects of the files are stored in a separate data storage system. A metadata service may be used to associate metadata with the files, thereby facilitating searches of the files using the metadata. By storing files in such a networked storage system, users may access the files from any computing device that has network connectivity.

In one embodiment, a user can access a user interface provided by or in connection with a networked storage system to upload data files for storage in the networked storage system. In other embodiments, a communications medium such as electronic mail (email) is employed to inject files into the networked storage system. Specifically, users who are associated with networked storage accounts in the networked storage system generate emails that are sent to an email destination defined by a destination address. Upon receiving a file destined for storage in the networked storage system, embodiments of the disclosure can also upload certain data files to a third party system as described herein. In the following discussion, a general description of the system and its components is provided, followed by a discussion of the operation of the same.

Figure 1:
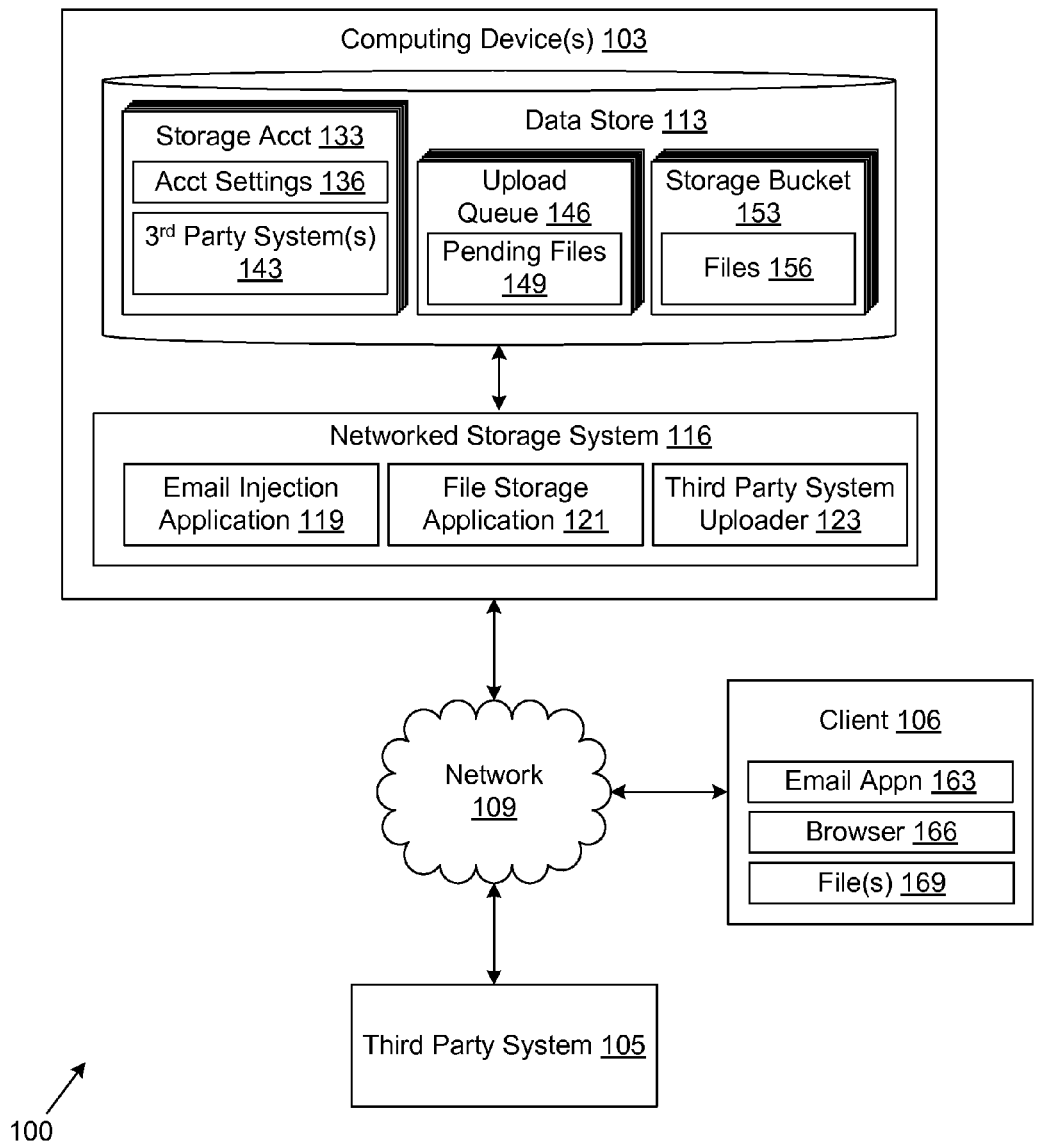
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with at least one third party system 105 as well as one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores 113 as can be appreciated. The data stored in the data store 113, for example, is associated with the operation of the various applications and/or functional entities described below.

The components executed on the computing device 103, for example, include a networked storage system 116 that includes an email injection application 119, a file storage application 121, a third party system uploader 123, and other applications, services, processes, systems, engines, or functionality not discussed in detail herein. The networked storage system 116 is executed to maintain a file hierarchy of files and folders in networked or metadata-based file systems for users. To this end, the networked storage system 116 may support various file-related operations such as, for example, creating files, deleting files, modifying files, moving files, copying files, setting permissions for files, downloading files, modifying file attributes or meta data, and/or other operations.

The email injection application 119 is executed to provide for the receipt of files to be stored by the networked storage system 116 using email as a communication mechanism. The email injection application 119 receives files as attachments to emails sent to an email destination set forth by the email injection application 119 itself. Such file attachments are removed by the email injection application 119 to be stored by the networked storage system 116 as will be described.

The file storage application 121 is executed to provide for the receipt of files to be stored by the networked storage system 116 using other mechanisms with which a file can be received. In one embodiment, a user can upload a file to the file storage application 121 via a browser interface. Users may also upload files to the file storage application 121 via a special purpose application executed on a client 106 (e.g., a mobile device, desktop computer, etc.) that is configured to interact with the file storage application 121 according to a specified protocol. The file storage application 121 can also allow a user to modify, copy, move, delete or perform other operations to files, folders, or other storage locations associated with an account of the user.

A metadata service may be executed in association with or as part of the networked storage system 116 to maintain metadata items in association with files. To this end, such a metadata service may support various operations such as, for example, creating metadata items, deleting metadata items, retrieving metadata items, searching on metadata items, and/or other operations. The metadata service may also implement one or more searchable indices of the metadata items. Additionally, the networked storage system 116 can also provide a tagging service the allows users to tag certain files, folders, or other constructs that are provided with which to categorize files with meta data. In one embodiment, this meta data can include one or more tags that identify a third party system with which a file, folder, or storage location should be uploaded upon storage of the file in the networked storage system 116. This meta data can also include information regarding authentication credentials for a third party system, a storage or publishing location within a third party system where files should be uploaded or published, and other attributes as will be described herein.

Various applications may be provided that correspond to hosted applications that may access the data stored in the networked storage system. Such applications may, for example, have a web-based interface and may serve up network pages, such as web pages or other forms of network content, to facilitate user interaction. Other applications may be internal applications and may not have a web-based interface. Non-limiting examples of such applications may include a mobile uploader application allowing a user to upload files from a mobile device to the networked storage system 116, a desktop uploader allowing a user to upload and/or sync files with the networked storage system 116, photo organizing tool, a music file organizer and playback tool, a word processor, a spreadsheet, an email application, and so on.

The third party system uploader 123 is executed to upload files stored in a networked storage system to a third party system 105. The third party system uploader 123 can identify files associated with a storage account to upload to a third party system 105. The third party system uploader 123 can also initiate upload of a file to the third party system 105 when a file is tagged as associated with a third party system 105 by the user, when the file is stored in a folder, tag, label and/or directory that is also associated with a third party system 105 as will be described in more detail herein.

The data stored in the data store 113 includes, for example, storage accounts 133. Associated with each storage account 133 are account settings 136 and one or more third party system identifiers 143. The third party system identifiers 143 can include, for example, information about third party systems 105 with which a user wishes to associate his or her storage account 133. The storage account 133 may also include information about a user with which the storage account 133 is associated. Such information may comprise, for example, name, address, payment instruments, and other information. The account settings 136 may be employed to specify and track various settings and other functionality with respect to a given storage account 133 such as passwords, security credentials, file management permissions, storage quotas and limitations, authorized access applications, billing information, and/or other data.

The computing device 103 can maintain an upload queue 146 associated with the third party system uploader 123 in which one or more pending files 149 can be stored or referenced. The pending files 149 can be those which are identified by the third party system uploader 123 to be uploaded to a third party system 105. In one embodiment, the third party system uploader 123 can be configured with one or more connectors or modules that allow the third party system uploader 123 to communicate with and upload files from the upload queue 146 to a third party system 105. In this respect, the third party system uploader 123 can be configured with various third party system configurations that can describe authentication protocols, application programming interface (API) definitions, and upload workflows, and other information on which the third party system uploader 123 can rely to determine an upload protocol required to upload a file to a third party system.

Each storage bucket 153 provides for long term storage of files 156 for a given storage account 133. The files 156 can be arranged in a storage bucket 153 associated with a storage account 133 in a folder structure or any other structure by which files can be organized. In one embodiment, files 156 can be stored in a flat structure with tags assigned to the various files 156 by which they can be categorized by the user. Additionally, files 156 in a storage bucket can also include folders or directories, which can include other files and/or subfolders. Accordingly, a user can tag certain files 156 as associated with a third party system 105. In this way, a user can designate files 156 and/or folders that the user desires the third party system uploader 123 to upload to a third party system 105.

A third party system 105 can include one or more computing devices that facilitate a third party site and/or service in which files stored by the user in the networked storage system 116 can also be stored and/or published. In this regard, a third party system 105 can represent a social networking system, a media storage or backup system, another networked storage system or service, a publishing system, such as a blogging site or microblogging site, or other third party systems as can be appreciated. A third party system 105 can be accessible via the network 109 as well as via an application programming interface (API) that allows the third party system uploader 123 to upload files to a respective third party system 105.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as an email application 163, a browser 166, and/or other applications. The email application 163 is executed in the client 106 to facilitate communication with others via email. The browser 166 may be executed in a client 106, for example, to access and render network pages, such as web pages, or other network content served up by the computing device 103 and/or other servers. The client 106 may be configured to execute applications beyond the email application 163 or the browser 166 such as, for example, instant message applications, word processing applications, spreadsheet application, drawing applications, and/or other applications. In addition, various files 169 may be stored in the client 106 and attached to emails. Specifically, according to one embodiment, a user may employ the email application 163 to generate an email and attach one of the files 169 to the email as an attached file and send the same to a destination address associated with the email injection application 119. Additionally, a user may access email sites via browser 166 that provide email functionality as well as the ability to generate an email with a file attachment.

Additionally, the user may interact with the file storage application 121 to upload, modify, copy, move, delete, or perform other file operations with regard to the networked storage system in a browser 166 user interface or via a special purpose application configured to interact with the file storage application 121. Additionally, the file storage application 121 can facilitate a user interface in which a user can create associations between files, folders or other storage constructs and a third party system 105.

Next, a general description of the operation of the various components of the networked environment 100 is provided. According to one embodiment, the networked storage system 116 is considered to be a storage cloud as can be appreciated. To begin, it is assumed that a user is associated with a storage account 133 in the networked storage system 116. Accordingly, users can add files 156 to the networked storage system 116 for storage in a respective storage bucket 153 in various ways as referenced above. A user can add files 156 to the networked storage system 116 by interacting with a user interface facilitated by the file storage application 121. The file storage application 121 can provide a browser interface in which a user can add files or perform other file operations. As also noted above, a user on a client 106 can employ a special purpose application configured to allow the user to perform various file operations on files in the networked storage system 116.

As noted above, a user can add files to the networked storage system 116 via email or other messaging. In some embodiments, the process of addition of a file via email can include user validation, security checks, and other processes not discussed in detail herein. Additional detail regarding injection of a file into the networked storage system 116 via email is disclosed in U.S. application Ser. No. 13/047,247, filed Mar. 14, 2011 and entitled "Email Injection of Files into Networked Storage Systems," which is hereby incorporated herein in its entirety.

In one embodiment, the third party system uploader 123 can allow a user to designate one or more folders or directories as associated with a third party system 105. Therefore, the third party system uploader 123 can be configured to upload and/or publish any files added by the user to the designated folder to the designated third party system 105. In one example, the user can designate a folder as associated with a social networking system. Accordingly, any files added to the folder and/or a subfolder within the folder can be uploaded by the third party system uploader 123 to the social networking system. In this scenario, the user can also specify certain upload attributes or rules associated with the third party system 105. For example, the user can specify that all files in a particular folder in the networked storage system 116 be added to a particular photo album in a social networking system, media storage or backup system, etc. As another example, the user can specify that all files in a particular folder be added to a particular storage location in a third party system 105 and designated with particular privacy level or access rights in the third party system 105.

In another embodiment, a user can designate a file type specific association with a third party system 105 via the third party system uploader 123. For example, the third party system uploader 123 can allow the user to associate files of a specific type (e.g., images, audio, video, etc.) in a specific folder and/or subfolder, with a third party system 105. In this example, the third party system uploader 123 can determine whether a file added to a particular folder is of the type specified by the user and initiate upload of the file to the third party system 105 if the file type meets the specified criteria.

Additionally, the user can specify a publishing rule associated with a third party system 105 and/or a specific file or folder in the user's storage account 133, which can provide additional customization capability. In this example, the user can specify a rule that a public link to a file added to the networked storage system 116 be generated by the third party system uploader 123 and that the public link be published in a blogging site, social networking system, microblogging site, or any publishing system as can be appreciated.

The third party system uploader 123 can maintain a third party system data structure such as a map, lookup table, or other type of data structure that includes entries for the various folders and/or files within the networked storage system 116 that are associated with a third party system 105 as designated by the various users of the system. In one embodiment, each file and/or folder so designated by the various users of the system can be associated with a unique identifier that identifies the file or folder within the networked storage system 116. Each entry in such a data structure can also identify a third party system 105 with which the file and/or folder is associated as well as authentication credentials that allow the third party system 105 to access an account in the third party system 105 that is designated by the user. In one embodiment, authentication credentials associated with a third party system 105 can include a username/password pair, an authentication token, or other credential with which the third party system uploader 123 can access an account in a third party system 105 specified by the user.

Such a third party system data structure can be maintained in memory in some embodiments to facilitate performance considerations. In other embodiments, such a data structure can be stored in a disk and/or data store. Each entry in the data structure can also be associated with one or more upload attributes in the third party system 105. An upload attribute can vary depending on the type of third party system 105 with which it is associated. Upload attributes can describe a storage location, folder name, album name, privacy level, account name, or any other meta data that can be associated with and supported by an upload to a third party system 105.

Therefore, in one embodiment, the third party system uploader 123 can be implemented as a listener process that receives messages from the email injection application 119 and/or file storage application 121 regarding any files that are added and/or modified in the networked storage system 116 on behalf of a user. Accordingly, the third party system uploader 123 can receive such a message and determine whether the file associated with the message is stored within a folder identified in the third party system data structure that is designated as associated with a third party system 105. If the third party system uploader 123 determines that such an association exists, it can then retrieve an entry from the data structure associated with file and/or folder that identifies the third party system 105 as well as any potential authentication credentials or other upload attributes associated with the third party system 105.

The third party system uploader 123 can then generate an entry in the upload queue 146 that identifies the file 156 in the networked storage system as well as the third party system 105 to which the file 156 is to be uploaded. In this way, by decoupling the process of adding and/or modifying a file in the networked storage system 116 from the process of uploading a file to a third party system 105 as facilitated by the email injection application 119 and/or file storage application 121, the third party system uploader 123 can synchronize files added to certain folders in the networked storage system 116 without significantly impacting the performance of the process of modifying files in a user's storage bucket 153. In other words, a file can be stored in a storage bucket 153 associated with a user's storage account 133 and confirmation provided to the user that the storage was successful. Meanwhile, upload to a third party system associated with the storage location can be initiated asynchronously by the third party system uploader 123 in a process that is decoupled from the user's direct interactions with the networked storage system 116.

In some embodiments, a user, via a user interface provided by the networked storage system 116, may modify meta data associated with a file and/or folder by designating a third party system 105, credentials associated with the third party system 105, upload attributes associated with the third party system 105, and other data that can be associated with a file and/or folder in the data structure maintained by the third party system uploader 123. Accordingly, the modification of a file and/or folder in the networked storage system 116 in this way can cause a message to be generated by the file storage application 121 that can be received by the third party system uploader 123. The third party system uploader 123 can then upload one or more files associated with such a modification to the designated third party system 105.

In the case of files added to user's storage bucket 153 via the email injection application 119 that are subsequently uploaded to a third party system 105 by the third party system uploader 123, embodiments of the disclosure can allow a user to designate instructions regarding upload of the file to the third party system uploader 123. In one embodiment, an account alias associated with the third party system 105 can be stored in the storage account 133 that allows the third party system 105 to be identified by a string in a From address, subject line and/or body of an email containing a file attachment. The email injection application 119 can verify that the sender of the email is authorized to add files to the networked storage system 116 in a particular account and generate a message for the third party system uploader 123 that identifies the file as well as the account alias identified in the email. Accordingly, the third party system uploader 123 can retrieve an entry in the third party system data structure associated with the third party system 105 and initiate upload of the file to the third party system 105.

In this embodiment, account settings 136 can also allow a user to specify more than one account alias for a given account in a social networking system. Account aliases can also include other upload attributes associated with the third party system 105, such as a folder name, album name, or other upload attribute associated with an upload to the third party system 105.

A user can also specify a folder name in which a file attached to an email processed by the email injection application 119 is stored in a From address, subject line and/or body of the email. In this scenario, when the email injection application 119 stores the file attachment in the networked storage system 116, a message is generated and transmitted to the third party system uploader 123, which can initiate upload to a designated third party system 105 as described above.

Figure 2:
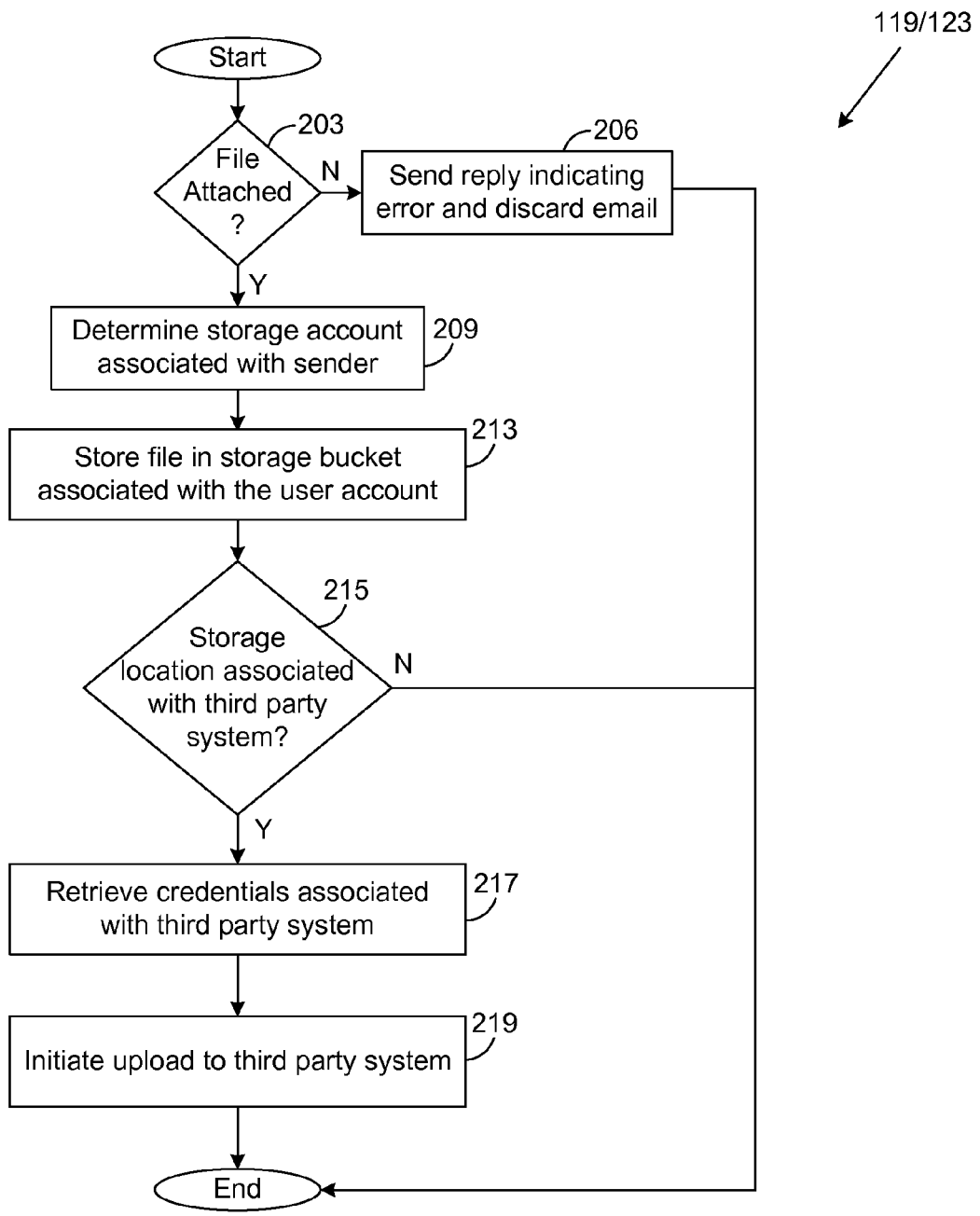
FIGS. 2-3 are flowcharts illustrating examples of functionality implemented as portions of a networked storage system in the networked environment of FIG. 1 according to various embodiments of the present disclosure.

Referring next to FIG. 2, shown is a flowchart that provides one example of the operation of at least a portion of the email injection application 119 and third party system uploader 123 according to various embodiments. It is understood that the flowchart of FIG. 2 provides merely an example of the many different types of functional arrangements that may be employed to implement the operation of the corresponding functionality of the email injection application 119 and third party system uploader 123 as described herein. As an alternative, the flowchart of FIG. 2 may be viewed as depicting an example of steps of a method implemented in the one or more computing devices 103 (FIG. 1) according to one or more embodiments. The flowchart of FIG. 2 depicts one example of the functionality of the email injection application 119 in receiving files 156 (FIG. 1) as file attachments in emails, taking action to store such file attachments as files 156, and uploading files 156 to a third party system 105 as described above.

Beginning in box 203, the email injection application 119 determines whether a file is attached to an incoming email. If not, then the email injection application 119 proceeds to box 206 in which a reply is generated and sent to the sender that indicates an error has occurred due to the fact that no file attachment existed. Thereafter, the email is discarded and the email injection application 119 ends as shown.

However, assuming that the received email includes a file attachment, then the email injection application 119 proceeds to box 209. In box 209, the email injection application 119 identifies a storage account associated with the sender of the email. In box 213, the email injection application 119 can identify a storage account associated with the sender. The storage account associated with the sender can be extracted from a string included as a part of a "From" address associated with the email, an identifier embedded within the header, body, or other portion of the email, or the email address to which the email was sent may uniquely identify the storage account 133.

Once the storage account has been identified in box 209, then the email injection application 119 proceeds to box 213 to store the file in a storage bucket associated with the storage account. The file can be stored in various storage locations in the storage bucket 153 as configured by the user and/or specified in the account settings 136 associated with the storage account 133. In box 215, the third party system uploader 123 can determine whether the storage location in which the file was stored in the networked storage system 113 is associated with a third party system 105. As noted above, this process can be decoupled from or asynchronous in relation to the process of storing the file in the networked storage system 113. In box 217, the third party system uploader 123 can retrieve credentials and/or other upload attributes associated with the designated third party system 105 and initiate upload to the third party system in box 219.

Figure 3:
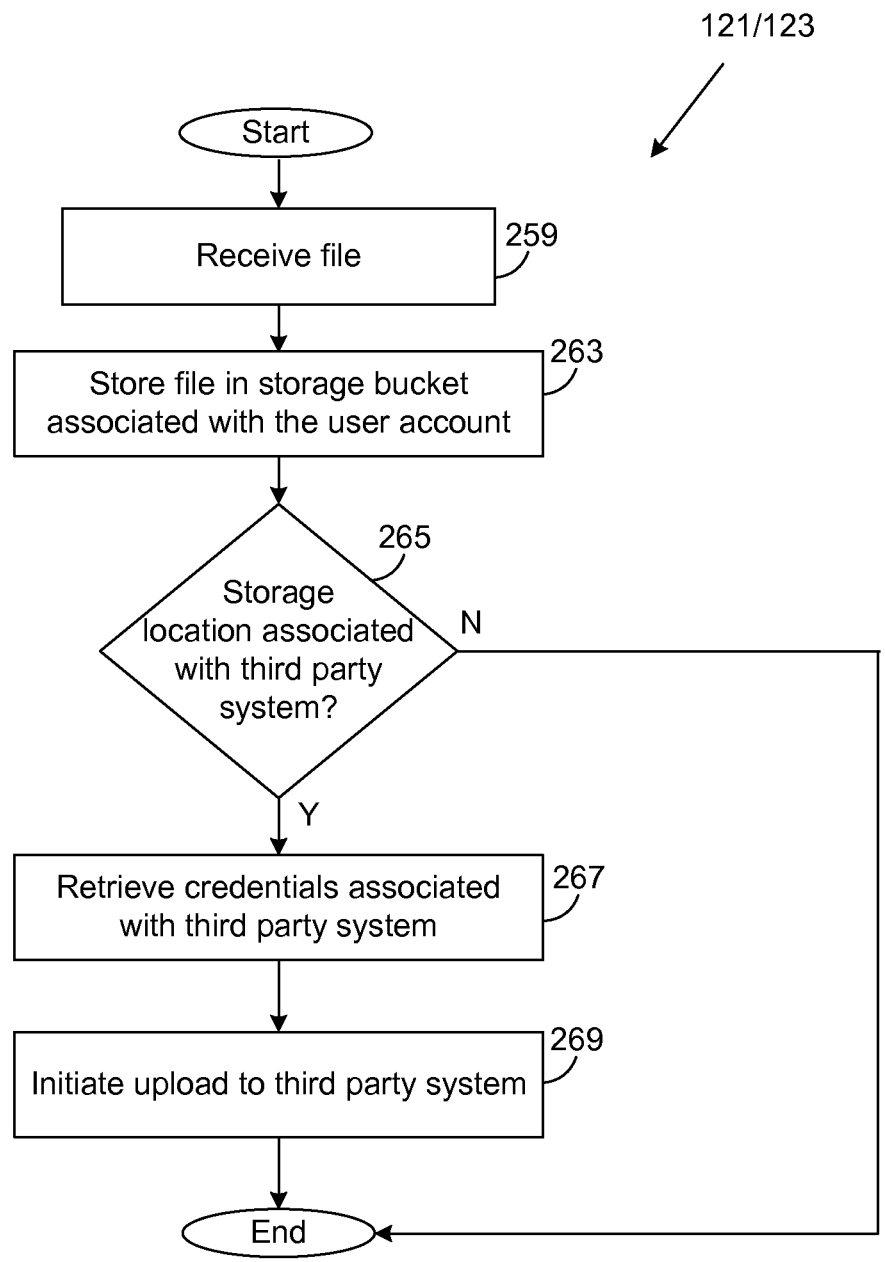

Referring next to FIG. 3, shown is a flowchart that provides one example of the operation of at least a portion of the file storage application 121 and third party system uploader 123 according to various embodiments. It is understood that the flowchart of FIG. 3 provides merely an example of the many different types of functional arrangements that may be employed to implement the operation of the corresponding functionality of the file storage application 121 and third party system uploader 123 as described herein. As an alternative, the flowchart of FIG. 3 may be viewed as depicting an example of steps of a method implemented in the one or more computing devices 103 (FIG. 1) according to one or more embodiments. The flowchart of FIG. 3 depicts one example of the functionality of the file storage application 121 receiving files to be stored in the networked storage system 116 and the uploading of files 156 to a third party system 105 as described above.

Beginning in box 259, the file storage application 121 receives a file to be stored via the networked storage system 116. In box 263, the file storage application 121 proceeds to store the file in a storage bucket associated with the storage account. The file can be stored in various storage locations in the storage bucket 153 as configured by the user and/or specified in the account settings 136 associated with the storage account 133. In box 265, the third party system uploader 123 can determine whether the storage location in which the file was stored in the networked storage system 113 is associated with a third party system 105. As noted above, this process can be decoupled from or asynchronous in relation to the process of storing the file in the networked storage system 113. In box 267, the third party system uploader 123 can retrieve credentials and/or other upload attributes associated with the designated third party system 105 and initiate upload to the third party system in box 269.

Figure 4:
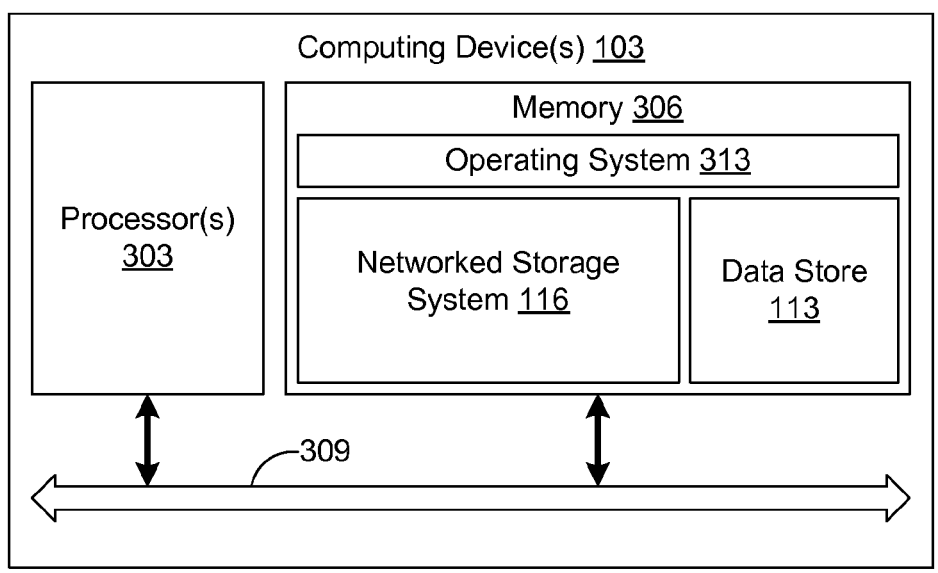
FIG. 4 is a schematic block diagram that provides one example illustration of a computing device that facilitates the networked storage system in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 303 and a memory 306, both of which are coupled to a local interface 309. To this end, the computing device 103 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are the networked storage system 116 including the email injection application 119, file storage application 121, third party system uploader 123 and potentially other applications. Also stored in the memory 306 may be a data store 113 and other data. In addition, an operating system 313 may be stored in the memory 306 and executable by the processor 303.

It is understood that there may be other applications that are stored in the memory 306 and are executable by the processors 303 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors 303 and the memory 306 may represent multiple memories 306 that operate in parallel processing circuits, respectively. In such a case, the local interface 309 may be an appropriate network that facilitates communication between any two of the multiple processors 303, between any processor 303 and any of the memories 306, or between any two of the memories 306, etc. The local interface 309 may comprise additional systems designed to coordinate this communication, including, for example, performing load balancing. The processor 303 may be of electrical or of some other available construction.

Although the networked storage system 116, including the email injection application 119, file storage application 121, third party system uploader 123, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-3 show the functionality and operation of an implementation of portions of the email injection application 119, file storage application 121, and third party system uploader 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flowcharts of FIGS. 2-3 show a specific order of execution, it is understood that the order of execution may differ from that which is depicted. For example, the order of execution of two or more blocks may be scrambled relative to the order shown. Also, two or more blocks shown in succession in FIGS. 2-3 may be executed concurrently or with partial concurrence. Further, in some embodiments, one or more of the blocks shown in FIGS. 2-3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, such as the networked storage system 116, including the email injection application 119, file storage application 121, and third party system uploader 123, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that maintains a plurality of networked storage accounts in a networked storage system for a plurality of users, the networked storage system comprising a plurality of computing devices;
    code that receives a file to be stored in the networked storage system via at least one of an email with a file attachment or an uploaded file uploaded by a user to the networked storage system;
    code that identifies a storage account associated with the user;
    code that identifies a storage location in the networked storage system associated with the file;
    code that stores the file in the storage location in the networked storage system in association with the storage account;
    code that determines whether the file has been tagged with a respective tag;
    code that determines whether the respective tag is associated with a third party system by determining whether the respective tag corresponds to an entry in a third party data structure associated with the storage location, the entry identifying another storage location within the third party system, the third party system being external to the networked storage system and accessible via a network;
    code that identifies the third party system and an authentication credential associated with the third party system in the third party data structure, the authentication credential being associated with a third party system account of the user in the third party system, the third party system account being different from the storage account of the user; and
    code that initiates an upload of the file to the third party system in the third party system account associated with the authentication credential in response to determining that the respective tag is associated with the third party system.

2. The non-transitory computer-readable medium of claim 1, wherein the authentication credential is at least one of: a username and password pair or an authentication token.

3. The non-transitory computer-readable medium of claim 1, wherein the third party system further comprises at least one of: a social networking system, a multimedia storage system, or a publishing system.

4. A system, comprising:
    a networked storage system;
    at least one computing device; and
    a third party system uploader executable in the at least one computing device, the third party system uploader comprising:
        logic that identifies whether a storage account in the networked storage system corresponds to an incoming email having at least one file attached thereto;
        logic that extracts the at least one file from the incoming email in response to the storage account being identified;
        logic that stores the at least one file in a storage location in the networked storage system in association with the storage account;
        logic that determines whether the at least one file has been tagged with a respective tag;
        logic that determines whether the respective tag is associated with a third party system by determining whether the respective tag corresponds to an entry in a third party data structure associated with the storage location, the entry identifying another storage location within the third party system, the third party system being external to the networked storage system and accessible via a network; and
        logic that initiates an upload of the at least one file to the third party system in response to determining that the respective tag is associated with the third party system, the upload being initiated using an authentication credential for the third party system.

5. The system of claim 4, wherein the logic that identifies whether the storage account in the networked storage system corresponds to the incoming email further comprises logic that determines whether a first identifier associated with the incoming email matches a second identifier stored in association with the storage account.

6. The system of claim 5, wherein:
the first identifier further comprises a string included in at least one of a From email address, a subject, or a body of the incoming email; and
the second identifier is another string associated with the storage account.

7. The system of claim 5, wherein the first identifier further comprises a string associated with the storage location in the storage account.

8. The system of claim 5, wherein the first identifier further comprises a string corresponding to the third party system.

9. The system of claim 5, wherein the first identifier further comprises a string corresponding to at least one storage attribute associated with the third party system, the at least one storage attribute identifying a third party system storage location.

10. The system of claim 4, wherein the authentication credential is at least one of: a username and password pair or an authentication token.

11. The system of claim 4, wherein the third party system further comprises at least one of: a social networking system, a multimedia storage system, or a publishing system.

12. The system of claim 4, wherein the third party system uploader further comprises:
logic that receives at least one message from the networked storage system confirming a storage of the at least one file; and
logic that initiates the upload when the at least one message is received.

13. The system of claim 4, wherein the logic that initiates the upload of the at least one file to the third party system further comprises logic that adds a task comprising an upload process to the third party system to an upload queue.

14. A method, comprising:
receiving, in at least one computing device, a file associated with a storage account in a networked storage system;
storing, in the at least one computing device, the file associated with the storage account in a storage location in the networked storage system;
determining, in the at least one computing device, whether the file has been tagged with a respective tag;
determining, in the at least one computing device, whether the respective tag is associated with a third party system by determining whether the respective tag corresponds to an entry in a third party data structure associated with the storage location, the entry identifying another storage location within the third party system, the third party system being external to the networked storage system and accessible via a network; and
initiating, in the at least one computing device, an upload of the file to the third party system in response to determining that the respective tag is associated with the third party system, the upload being initiated using an authentication credential for the third party system, the authentication credential having been stored with the networked storage system.

15. The method of claim 14, further comprising:
generating, in the at least one computing device, a message when the file is stored in the storage location;
transmitting, in the at least one computing device, the message to a listener process executed in the at least one computing device, the listener process configured to add a task comprising an upload process to the third party system to an upload queue; and
wherein initiating the upload of the file to the third party system is performed asynchronously with the storing the file to the storage location.

16. The method of claim 14, wherein the entry in the third party system data structure further comprises a unique identifier associated with the storage location and an identifier corresponding to the third party system.

17. The method of claim 16, wherein the authentication credential is at least one of: a username and password pair or an authentication token.

18. The method of claim 14, wherein the third party system further comprises at least one of: a social networking system, a multimedia storage system, or a publishing system.

* * * * *